United States Patent
Hansen et al.

(10) Patent No.: US 9,895,687 B2
(45) Date of Patent: Feb. 20, 2018

(54) PROCESS FOR REGENERATION OF TAR REFORMER CATALYST

(71) Applicant: Haldor Topsøe A/S, Kgs. Lyngby (DK)

(72) Inventors: John Bøgild Hansen, Humlebæk (DK); Jørgen Madsen, Hillerød (DK); Klas Jerker Andersson, Copenhagen (DK)

(73) Assignee: Haldor Topsoe A/S, Lyngby (DK)

( * ) Notice: Subject to any disclaimer, the term of this patent is extended or adjusted under 35 U.S.C. 154(b) by 0 days.

(21) Appl. No.: 15/518,025

(22) PCT Filed: Dec. 15, 2015

(86) PCT No.: PCT/EP2015/079810
§ 371 (c)(1),
(2) Date: Apr. 10, 2017

(87) PCT Pub. No.: WO2016/096868
PCT Pub. Date: Jun. 23, 2016

(65) Prior Publication Data
US 2017/0252739 A1    Sep. 7, 2017

(30) Foreign Application Priority Data
Dec. 15, 2014 (DK) .................... 2014 00727

(51) Int. Cl.
| | | |
|---|---|---|
| *B01J 38/14* | (2006.01) | |
| *B01J 38/02* | (2006.01) | |
| *B01J 35/02* | (2006.01) | |
| *B01J 35/04* | (2006.01) | |
| *C01B 3/02* | (2006.01) | |
| *C10J 3/20* | (2006.01) | |
| *C10K 3/02* | (2006.01) | |

(52) U.S. Cl.
CPC ............. *B01J 38/14* (2013.01); *B01J 35/026* (2013.01); *B01J 35/04* (2013.01); *B01J 38/02* (2013.01); *C01B 3/02* (2013.01); *C10J 3/20* (2013.01); *C10K 3/023* (2013.01); *C10J 2200/06* (2013.01); *C10J 2300/0916* (2013.01); *C10J 2300/0956* (2013.01); *C10J 2300/0986* (2013.01); *C10J 2300/1807* (2013.01)

(58) Field of Classification Search
CPC . B01J 38/14; B01J 35/026; B01J 35/04; B01J 38/02; C01B 3/02
USPC ........................................................ 502/56
See application file for complete search history.

(56) References Cited

U.S. PATENT DOCUMENTS

| | | |
|---|---|---|
| 3,838,038 A | 9/1974 | Greenwood et al. |
| 5,213,587 A | 5/1993 | Ekström et al. |
| 2011/0039686 A1 | 2/2011 | Li et al. |
| 2011/0118105 A1 | 5/2011 | Schwank et al. |
| 2012/0058030 A1 | 3/2012 | Suzuki et al. |
| 2013/0023707 A1 | 1/2013 | Keefer et al. |

FOREIGN PATENT DOCUMENTS

| | | |
|---|---|---|
| DE | 692 03 035 T2 | 10/1995 |
| DE | 200 12 865 U1 | 12/2000 |
| EP | 0 220 342 A1 | 5/1987 |
| EP | 1 724 326 A1 | 11/2006 |
| EP | 2 236 204 A1 | 10/2010 |
| GB | 554681 A | 7/1943 |
| JP | 11-43681 A | 2/1999 |
| KR | 10-2011-0052839 A | 5/2011 |

OTHER PUBLICATIONS

K. Magrini, "Producing Clean Biomass Syngas for Fuel Synthesis: Reforming Catalyst Development World Renewable Energy Forum", URL:https://ases.conference-services.net/resources/252/2859/pres/SOLAR2012_0732_presentation.pdf, May 14, 2012, pp. 1-11.

K. Magrini et al., "Reforming Catalyst Performance During a Pilot Scale Demonstration of Biomass Syngas to Ethanol", URL:http://www.gastechnology.org/tcbiomass/tcb2013/13-Magrini-tcbiomass2013-presentation-Wed.pdf, Sep. 4, 2013, pp. 1-8.

J. Fjellerup et al., "General Rights Copyright and Moral Rights for Formation, Decomposition and Cracking of Biomass Tars in Gasification", URL:http://orbit.dtu.dk/files/3220398/pyrotar2.pdf, Jan. 1, 2005, pp. 1-59.

*Primary Examiner* — Edward Johnson
(74) *Attorney, Agent, or Firm* — Blank Rome LLP

(57) ABSTRACT

The invention relates to a catalyst regeneration process for a tar reforming catalyst within a catalyst bed in a tar reformer. The process comprises the steps of:—Admitting a main gas stream with controlled temperature and oxygen content to an inlet into the tar reformer;—Passing the main gas stream through the catalyst bed to form an oxygen depleted gas stream;—Exiting the oxygen depleted gas stream from the tar reformer; and—Recycling at least a part of the oxygen depleted gas stream exiting from the tar reformer back into said main gas stream upstream said tar reformer. The temperature of said main gas stream at the inlet is controlled to be within the range from about 500° C. to about 1000° C.

14 Claims, 6 Drawing Sheets

PROCESS FOR REGENERATION OF TAR REFORMER CATALYST

FIELD OF THE INVENTION

The present invention relates to a process for the regeneration of a catalyst within a tar reformer. The present invention moreover relates to a system for regeneration of a catalyst within a tar reformer.

BACKGROUND

Gasification of biomass, waste or coal produces synthesis gas, a gas essentially comprising methane, carbon monoxide, hydrogen, water and carbon dioxide. Synthesis gas is also known as syngas. Syngas may be used as a source of fuel, hydrogen or carbon monoxide, or may be used for downstream syngas conversions. Manipulation of reaction equilibria and reaction conditions influences the ratio of the gaseous products and therefore provides the preferred gas (i.e. methane, hydrogen or carbon monoxide). Apart from the aforementioned main constituents the product gas from a gasifier contains sulphur compounds, e.g. $H_2S$ and COS, ammonia, dust, alkali, impurities such as P, As, Hg etc. and tar components.

Gasification may be carried out above- or under-ground. Above-ground gasification of biomass, waste and coal may be carried out using an apparatus selected from the group consisting of moving bed reactor (Lurgi-type reactor), fluid bed apparatus, or a biomass gasifier, including, for example, a pyrolysis unit as described in Gasification by Christopher Higman and Maarten van der Burgt GPP, Elsevier Amsterdam 2008 and 'Biomass Gasification' chapter 4 in 'Alternative Energy in Agriculture' Vol. II, Ed. D. Yogi Goswami CRC Press 1986 pp 83-102. Underground coal gasification is described in http://www.ucgassociation.org Gasification of biomass, waste and coal may be carried out at temperatures of up to 1800° C. [Higman and Maarten van der Burgt]. The temperature of the gasification of biomass, waste or coal may also be 1000° C. or less. The temperature of the gasification of biomass, waste or coal may be 900° C. or less, 800° C. or less, less than 800° C., 750° C. or less, less than 750° C., 700° C. or less, less than 700° C. The product gas stream has a pressure of between 1 barg and 100 barg, between 2 barg and 100 barg, up to 100 barg, up to 25 barg, up to 20 barg. Barg means overpressure in bar. Typically the biomass gasifier has an operating pressure from 0-20 barg.

Biomass & Bioenergy 24 (2003) pp 125-140 discloses that the temperature of such gasification processes not only affects the amount of tar formed, but also the composition of the tar. Tar composition ranges from primarily oxygenates at lower gasification temperatures (e.g. alcohols, aldehydes, ethers, esters, ketones, organic acids, and sugars), to primarily poly-aromatic hydrocarbons at higher gasification temperatures. Besides tar, the gasifier syngas also contains lighter hydrocarbons, e.g. methane, ethene, ethane, propene, propane, benzene and toluene.

Steam reforming of tar, or tar reforming, is the process carried out over a catalyst to convert tar to syngas. The process of reducing the tar species present in syngas is part of the gas conditioning, i.e. the train of unit operations needed before the syngas may be utilised for downstream applications, such as synthesis of chemicals or electricity. Dust in the syngas may be removed upstream or downstream of the tar reforming step, corresponding to the embodiments of tar reforming taking place in nearly dust free or dusty environment. The term "clean tar reformer" is meant to denote a tar reformer in a biomass gasification system wherein a filter is present between a biomass gasification unit and the tar reformer. This is opposed to the term "dusty tar reformer" which is meant to denote a tar reformer in a biomass gasification system wherein no filter, besides possible cyclones for a coarse removal of dust, is present between the biomass gasification unit and the tar reformer. The catalysts may be present in pellet or monolith form, of which the monoliths and pellets may be used for the clean tar reformer, whereas monoliths must be applied for the dusty tar reformer. The process of the present invention is suitable both for use in a dusty or dust-free environment, here referred to as dusty tar reforming and clean tar reforming, respectively.

In a dust-free environment, carbon coke formation from decomposition of syngas tar and hydrocarbons can take place in and on the catalyst, and/or carbon soot generated from partial combustion of the syngas from the gasifier can deposit and build up in and on the catalyst. This can lead to catalyst deactivation and/or increased pressure drop and inhomogeneous gas distribution due to locally increased restriction of gas passage through the catalyst volume. These phenomena all affect catalyst performance negatively. In addition, in a dusty environment the dust entrained in the gas can itself build-up in and on the catalyst, and lead to worsened, i.e. reduced, catalyst performance similar to the dust-free case. The dust has high carbon content, e.g. about 70% by weight, and is typically of a pyrolytic nature. Dust, coke, and soot, are all herein commonly referred to as carbonaceous materials.

Regeneration procedures for catalysts within a tar reformer are essential to ensure prolonged catalyst lifetime. Tar reformer catalyst regeneration is however challenging in relation to the risk of excessive temperature development within the reformer as a result of the exothermic carbon combustion, as well as energy consumption. Furthermore, pyrolytic and graphitic type of carbon from hydrocarbon decomposition, soot formation, or dust has low reactivity and can require temperatures above 600° C. for efficient oxidative combustion removal. The amounts of the deposited carbon can be of such large quantities that it requires a very controlled high-temperature oxidative burn-off to avoid temperature run-aways.

Regeneration of a catalyst within a tar reformer may be a process with very high energy consumption and/or with an excessive consumption of steam. US2012/0058030 discloses a method for regenerating catalyst for reforming tar-containing gas. US2012/0058030 describes that in a method for regenerating a deteriorated catalyst, water vapour is fed in a catalyst reactor, where water vapour reacts with carbon to remove carbon present on the surface of catalyst, or water vapour reacts with sulphur to remove sulphur adsorbed thereon and thereby regenerates the catalyst. Air may be incorporated instead of a part or entirety of water vapour.

SUMMARY OF THE INVENTION

It is an object of the present invention to provide an improved process and system for regeneration of a catalyst within a tar reformer. In particular, it is an object of the present invention to provide a process and a system for regeneration of catalyst wherein the temperature development is controlled properly. It is a further object of the present invention to provide a process and system wherein the energy consumption and/or steam consumption is reduced.

These and other objects are achieved by the present invention according to the following features in correspondence with the appended claims.

Embodiments of the invention generally relate to a catalyst regeneration process for a tar reforming catalyst within a catalyst bed in a tar reformer. The process comprises the steps of: Admitting a main gas stream with controlled oxygen content to an inlet into the tar reformer; passing the main gas stream through the catalyst bed to form an oxygen depleted gas stream; exiting the oxygen depleted gas stream from the tar reformer; and recycling at least a part of the oxygen depleted gas exiting from the tar reformer back into the main gas stream upstream the tar reformer. The temperature of the gas stream at the inlet is controlled to be within the range from about 500° C. to about 1000° C.

By controlling the temperature as well as the oxygen content of the main gas inlet to the reformer, it is possible to control the temperature development within the reformer during regeneration. By recycling at least part of the oxygen depleted gas exiting from the reformer back to the reformer there is provided a substantial reduction in energy consumption for heating of the main gas compared to a once-through system. As used herein, the term "depleted" is meant to denote "reduce" or "reduce considerably". The term "oxygen depleted" is not intended to be limited to cases wherein the oxygen has been exhausted from the gas, but only to denote that the oxygen content of the gas has been reduced.

The tar reformer may be an autothermal reformer, a fired tubular reformer, a fired bayonet reformer or any other appropriate type of reformer.

In an embodiment, the temperature of said main gas stream at said inlet is controlled to be in the range between about 500° C. and about 950° C., preferably in the range between about 650° C. and about 950° C., more preferably in the range between about 700° C. and about 900° C. These temperature ranges are examples of advantageous temperatures for the regeneration process. The specific optimum temperature for a given process depends upon the catalyst and amount of active catalytic material in the tar reformer, the amount of carbonaceous material in the tar reformer, the oxygen content of the regenerative gas as well as whether the tar reforming is operated in a clean- or dusty mode.

In an embodiment, an additional oxidant gas stream with controlled oxygen content is added to the main gas stream and/or is admitted into one or more further inlets into the tar reformer. The addition of an oxidant gas stream, viz. a gas stream comprising oxygen, to the tar reformer renders it possible to control the oxygen content within the reformer, and thus the temperature during regeneration. The oxidant gas stream comprises for example air, enriched air, oxygen, steam and/or carbon dioxide.

The additional oxidant gas stream forms a regeneration gas stream together with the main gas stream which comprises the recycled stream. It should be noted that the term "regeneration gas stream" is meant to denote a gas stream comprising sufficient oxidant gas, typically oxygen, to be able to carry out regeneration of the catalyst in the tar reformer. Thus, the main gas stream itself may be a regeneration gas stream, if it contains oxygen; however, if the main gas stream does not comprise sufficient oxygen for regeneration of the catalyst in the tar reformer, the main gas stream will not become a regeneration gas stream before sufficient oxidant gas is added.

In the case where the additional oxidant gas stream is admitted into the main stream, the regeneration gas is therefore formed prior to admission into the tar reformer In the case where the additional oxidant gas stream is admitted into one or more further inlets into the tar reformer and where the main gas stream without the additional oxidant gas stream is not a regeneration gas stream, the regeneration gas stream is formed within the tar reformer from the main gas stream and the additional oxidant gas stream. In both these cases as well as in the case where the main gas stream without the additional oxidant gas stream is already a regeneration gas, the introduction of an additional oxidant gas renders it possible to control the oxygen content of the regeneration gas precisely. Hereby, the regeneration process and the temperature during the regeneration process may be controlled.

The main stream constitutes at least 50% of volume of the gas flowing through the tar reformer during catalyst regeneration. As an example only, the main stream constitutes about 90-95 vol % of the gas flowing through the tar reformer during catalyst regeneration, and the additional oxidant gas stream constitutes about 5-10 vol % of the gas flowing through the tar reformer during catalyst regeneration.

Typically, the additional oxidant gas stream forms between and 10 vol % of the regeneration gas stream, and often less than 1-2% of the regeneration gas stream. Typically the additional oxidant gas stream is air having an oxygen content of about 21 vol %, and an example of the oxygen content of the resulting regeneration gas is about 3 vol % or less.

In an embodiment, the tar reformer comprises a plurality of catalyst beds, wherein the additional oxidant gas stream is inlet into the tar reformer downstream at least one catalyst bed. In an embodiment, the tar reformer comprises a plurality of catalyst beds, wherein the oxidant gas stream is inlet into the tar reformer upstream at least one catalyst bed. The oxidant gas stream may firstly be admitted as a stream to the, under tar reforming conditions, most upstream catalyst bed, such that the catalyst beds are regenerated one by one, from the most upstream to the most downstream catalyst bed. However, by feeding the oxidant gas as a stream into the tar reformer in reverse order, from the most downstream to the most upstream catalyst bed, a process is provided wherein the temperature development in the tar reformer is particularly controllable.

In an embodiment, the main gas stream admitted to the tar reformer comprises a flue gas resulting from combusting a fuel in a burner, and where the flue gas passes through a biomass gasification unit upstream of the reformer. Typically, the recycling of gas exiting from the tar reformer back into the main gas stream upstream the tar reformer is carried out via a recycle blower, and the gas recycle is added just after the burner which is used to control the temperature of the mixed recycle and combustion gas. The control of oxygen to the burner, or more precisely the oxidant to fuel ratio, in turn provides control of the oxygen content of the regenerative gas. Further adjustment of oxygen content can be controlled by the addition of an optional oxidant gas stream with controlled oxygen content downstream the burner. Typically, no substantial amounts of biomass are present in the biomass gasification unit during regeneration of the catalyst in the tar reformer. However, the regeneration of the catalyst may take place soon after shut-down of the gasification unit, where the temperature of the biomass gasification unit and tar reformer still is elevated compared to the surroundings due to the maintained sensible heat in the gasifier and tar reformer materials after stopping the high temperature gasification process and tar reformer operation. In this case, the flue gas from the burner passing through the biomass gasification unit may draw heat from the walls of the gasification unit, as well as from the tar reformer, thereby lowering at least the initial load on the equipment for heating the main gas. Hereby, a reduction in the energy to be supplied in order to heat the main gas to a required temperature is obtained. Another advantage of this embodiment is that substantially no extra equipment is necessary to carry out the regeneration process in an existing biomass gasification plant with a tar reforming unit installed, except from the equipment for recycling gas exiting from the tar reformer back to the tar reformer. Such equipment for recycling comprises e.g. a recycle blower and gas pipes.

It is well-known to regenerate catalyst and to reestablish satisfactory performance of the reformer hosting the catalyst by use of steam. Regeneration in steam can be carried out at temperatures around 600-700° C. or higher depending on the ageing of the deposits. However, with addition of a small percentage of air, the burn off of carbon is easily performed at a temperature above about 450° C. See e.g. "Progress in Catalyst Deactivation" NATO Advanced Study Institutes, Series Vol 54, 1982, p. 127-149, article titled "Criteria for Carbon Formation" by J. R. Rostrup-Nielsen, from Springer Netherlands. However, such steam regeneration entails a substantial consumption of water. As an example, a traditionally used reforming catalyst regeneration procedure, being a once-through process, for regenerating catalyst within one clean tar reformer reactor having a catalyst volume of 39 m$^3$ consumes about 140 tons of water. Thus, a regeneration process wherein the main gas stream comprises flue gas with its natural steam content, and hence no dedicated steam generation process necessary, provides a substantial reduction of operating costs.

When a flue gas is used for catalyst regeneration instead of steam, the energy used for regeneration is reduced considerably due to the fact that heating of substantial volumes of water is avoided.

Thus, the main gas stream comprises flue gas from the burner, recycled gas exiting from the tar reformer in the form of an oxygen depleted gas stream. The main gas stream may be a regeneration gas stream or it may become a regeneration gas stream by the addition of the additional oxidant gas stream. However, for all embodiments it should be ensured that the gas stream flowing through the tar reformer during regeneration at least in a part of the tar reformer comprises sufficient oxygen for regeneration of the catalyst. In an embodiment, the main gas stream admitted to the tar reformer comprises a flue gas resulting from combusting a fuel in a burner, and where said flue gas has by-passed a biomass gasification unit. In this embodiment, where the flue gas from the burner is led directly from the burner to the tar reformer, any further equipment upstream of the reformer, such as a hot gas filter, may be bypassed. This allows for a higher temperature of the main gas stream led to the reformer, since the temperature is not limited by design temperatures or slow heating up of e.g. the gasification unit, the filter or any other equipment upstream the tar reformer. In this embodiment, the temperature of the main gas is limited mainly by the design temperature of the direct gas pipe from the burner to the tar reformer and by the tar reformer itself. This embodiment only requires a piping system directly from the start-up burner to the tar reformer and a recirculation system, whilst all other equipment is standard and typically already present in a biomass gasification system.

In an embodiment, the main gas stream to the tar reformer comprises a flue gas resulting from combusting a fuel in an additional burner. In this embodiment, a second or separate burner may be placed in the close vicinity of the tar reformer, such as at the top of the tar reformer. This allows for high regeneration temperatures, since the temperature of the main gas is only limited by the tar reformer design temperature. This provides a very fast reformer catalyst regeneration turn-around due to a minimum of material heat-up to reach the desired reformer temperature for the regeneration. Apart from the additional burner and a recirculation system all other equipment is standard.

In an embodiment, the main gas stream admitted to the tar reformer comprises a flue gas resulting from combusting a fuel containing sulfur in a burner. Thus, the regeneration stream typically comprises sulfur, e.g. a content of up to 150 ppmv. Because tar reforming is typically carried out in a syngas emanating from gasification of sulfur containing biomass, a certain content of sulfur and possibly also other contaminants is allowed in the fuel (e.g. natural gas, fuel oil, diesel, etc.) used for the burner. In the case of a sulfur sensitive traditional tubular steam reforming, a sulfur cleaning step of the burner fuel may be necessary, possibly using already available sulfur removal units at the plant.

A tar reformer being part of a biomass gasification system is typically able to withstand gas comprising sulfur and possibly also other contaminants. Therefore, the catalyst within the tar reformer is typically able to withstand a regeneration gas comprising flue gas with sulfur and/or other contaminants. When a combustion flue gas is used for catalyst regeneration, it is possible to substantially reduce the amount of water or steam necessary for the regeneration process.

In an embodiment, the tar reformer is a clean tar reformer, the catalyst is a pellet or monolith catalyst and a regeneration gas stream comprising the main gas stream and the optional additional gas stream has an oxygen content of maximum 3 vol %. In a clean tar reformer with pellet catalyst, the overall volume of catalyst pellets is typically large and there is thus a large amount of active catalytic material which similarly to carbon can oxidize in an exothermic process. In order to avoid excessive temperature development within the catalyst bed(s) during regeneration of the catalyst, the oxygen content or oxygen level of the regeneration gas is kept low. An even more preferred maximum value of the oxygen content of the regeneration gas stream is about 2 vol %. Typically, the catalyst within a clean tar reformer is a pellet catalyst with a relatively large volume.

In an embodiment, the tar reformer is a dusty tar reformer, the catalyst is a monolith catalyst and a regeneration gas stream comprising the main gas stream and the optional additional gas stream has an oxygen content of maximum 3 vol %. In a dusty tar reformer, the amount of deposited carbonaceous material within the catalyst in the tar reformer is considerable at the end of a cycle before regeneration. In order to avoid excessive temperature development within the catalyst bed(s) during regeneration of the catalyst, the oxygen content or oxygen level of the regeneration gas is kept low. A preferred maximum value of the oxygen content in the regeneration gas stream is about 2 vol %. Typically, the catalyst within a dusty tar reformer is a monolith catalyst with a relatively small amount of active catalytic material.

In an embodiment, the tar reformer is a dusty tar reformer, the catalyst is a monolith catalyst having only a small amount of carbonaceous material deposited, due to a short exposure time at tar reforming conditions, wherein a regeneration gas stream comprising the main gas stream and the optional additional gas stream has an oxygen content in the range from about 9 vol % to about 17 vol %, preferably in the range from about 12 vol % to about 14 vol %. An oxygen content within the range of about 9 vol % to about 17 vol % in the regeneration gas to a dusty tar reformer is advantageous in the case where the gasification unit has been shut down shortly before whilst the amount of carbonaceous material deposited within the dusty tar reformer is relatively low. This could be the case when the gasification unit is shut down for other reasons than for catalyst regeneration within the tar reformer. If the carbonaceous material deposition in the catalyst was high, regenerating with a stream containing oxygen within the range from about 9 vol % to about 17 vol % would typically be too reactive and cause excessive temperature development within the catalyst.

In an embodiment, the tar reformer is a dusty tar reformer, the catalyst is a monolith catalyst having only a small amount of carbonaceous material deposited, wherein biomass is combusted in the gasifier during start-up and wherein the flue gas from the combusted biomass is directed through the tar reformer in order to regenerate the catalyst at least partly during start-up of the biomass gasification system. When the amount of carbonaceous materials in the tar reformer is low, the gas from the burning off of the biomass may be led through the tar reformer, since the risk of excessive temperature development is low. Hereby, the time interval, before a system shut-down is required in order to regenerate the catalyst, may be prolonged. It should be noted that the term "start-up" of biomass gasification system corresponds to a heat-up of the biomass gasification system. The tar reformer may be heated up during the heat-up of the biomass gasification system or after the biomass gasification system has been heated.

In an embodiment, the main stream has a sulfur content of up to 200 ppmv. An allowed sulfur content of up to 200 ppmv in the flue gas is advantageous, since the lesser restrictions on fuel quality increases the number and flexibility of fuels available for regenerating the tar reformer catalyst.

Another embodiment relates to a system for regenerating a catalyst within a tar reformer comprising catalyst in one or more catalyst beds. The system comprises a burner for providing a main gas stream with controlled oxygen content and a controlled temperature. The system further comprises a gas inlet for admitting said main gas stream into the tar reformer, a gas outlet for withdrawing an oxygen depleted gas from the tar reformer, and recirculation equipment for recycling at least a part of the oxygen depleted gas to the main gas stream upstream the tar reformer.

In an embodiment of the system of the invention, the temperature of the main gas stream is in the range of from about 500° C. to about 1000° C.

BRIEF DESCRIPTION OF THE DRAWINGS

The invention is further illustrated by reference to the attached figures, where.

DETAILED DESCRIPTION OF THE DRAWINGS

Throughout the figures, like elements have been given like reference numbers. Features of the systems shown in FIGS. 2 to 5 may be combined.

Figure 1:
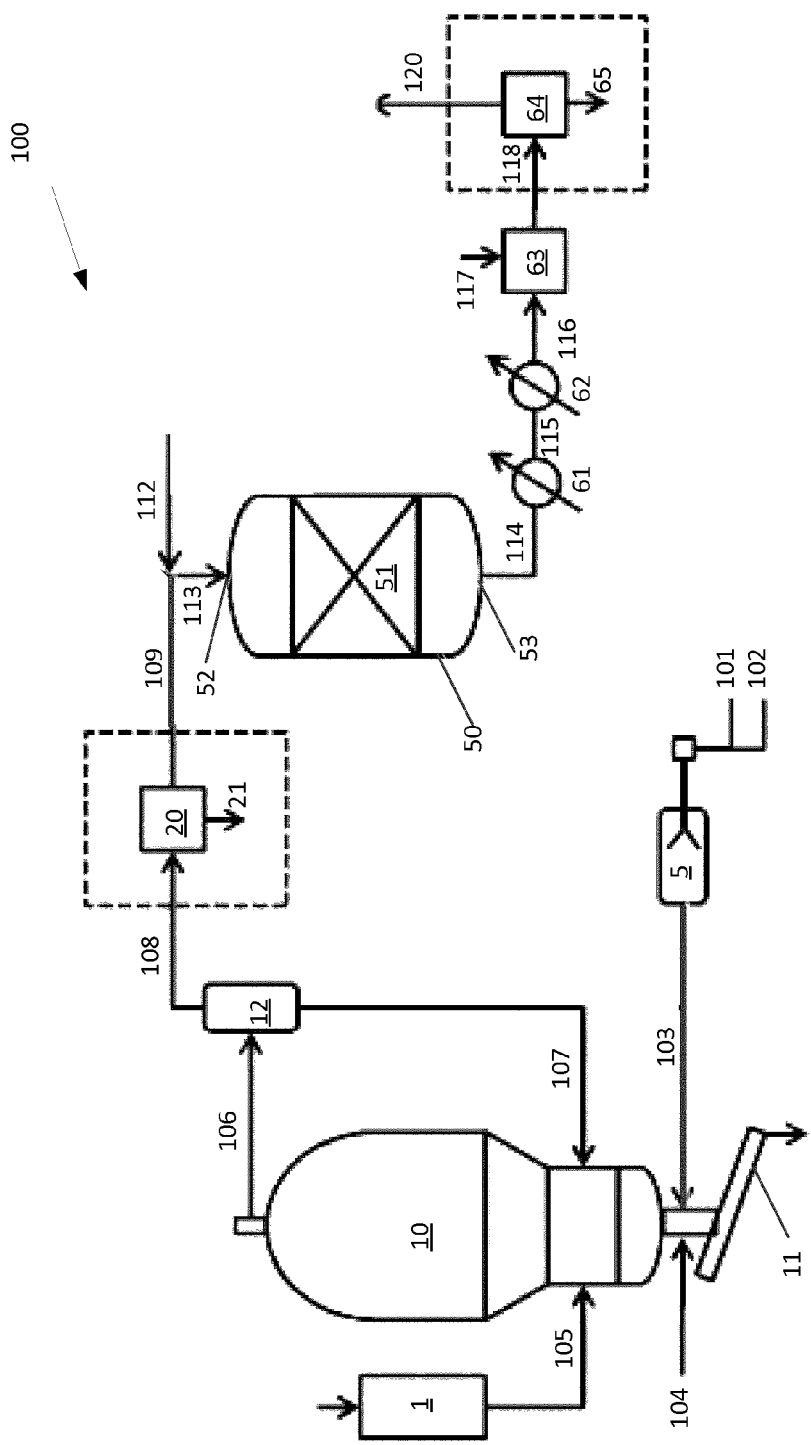
FIG. 1 shows a schematic drawing of a system for gasification of biomass.

FIG. 1 shows a schematic drawing of a system 100 for gasification of biomass.

The system 100 comprises a burner 5 which is used to preheat the gasification system. The temperature of the output gas from the burner, viz. a hot gas stream 103, may reach 600-650° C. or even higher. A fuel 101 and an oxidant stream 102, e.g. air, are combusted to form the hot gas stream 103 arranged for preheating a biomass gasification unit 10, typically up to 200° C. to 300° C.

For further heating of the biomass gasification system, up to e.g. 600° C. or 700° C., biomass is combusted in the gasifier unit 10. The biomass 105 is input to the biomass gasification unit 10 via a biomass feeding system 1.

An oxidant gas 104, e.g. air, oxygen, steam, carbon dioxide, etc. is inlet to the biomass gasification unit 10 in order to provide a controlled amount of oxygen within the biomass gasification unit 10.

When the appropriate biomass gasification system temperature is reached, the oxygen-to-biomass ratio is lowered to start the gasification process Oxidant gas 104 is added during both pre-heating of the biomass gasification system, viz. combustion, and during gasification of biomass.

The biomass gasification unit 10 has means 11 for outletting dust or ash, as well as an outlet for outletting gas.

The gas 106 resulting from the gasification of the biomass and outlet from the biomass gasification unit 10 is led to a cyclone 12 for removal of solids, dust and other particulate matter; the solids, dust and other particulate matter is, as stream 107, led back into the biomass gasification unit 10, whilst another part 108 of the stream from the biomass gasification unit 10 is led to an optional filter 20. The stream 108 is a dusty raw biomass gasification syngas. The filter 20 is present in case the biomass gasification system being a system with a clean tar reformer. Dust or ash 21 is removed from the filter 20. The resultant gas stream 109 is admitted into a tar reformer 50 via an inlet 52. In the case of a clean tar reformer, viz. the option including the filter 20, the stream 109 is a raw, substantially dustfree biomass syngas. An oxidant gas stream 112 is admitted into the tar reformer 50 via the inlet 52 together with the gas stream 109. The gas stream 109 and the oxidant gas stream 112 together forms a gas stream 113 for tar reforming.

The tar reformer 50 comprises catalyst in one or more catalyst beds 51 as well as the gas inlet 52 for inletting the gas stream 113 into the tar reformer 50 and a gas outlet 53 for outletting a conditioned gas stream 114 from the tar reformer 50.

Heat exchangers 61, 62 are provided downstream the tar reformer 51 for recuperating heat from the conditioned gas stream 114, in order to provide cooled conditioned gas stream 116, and are succeeded by a quenching unit 63 to which the cooled conditioned gas stream 116 and a stream of steam or water 117 are input for further cooling of the cooled conditioned gas stream 116. The resultant cooled conditioned gas stream 118 is input into an optional dust filter 64.

The optional filter 64 is present in case the biomass gasification system is a system with a dusty tar reformer. Dust or ash 65 is removed from the filter 64.

The cooled, conditioned dustfree gas 120 is output for further processing and/or subsequent use. The cooled, conditioned dustfree gas 120 is substantially a synthesis gas or syngas.

Figure 2:
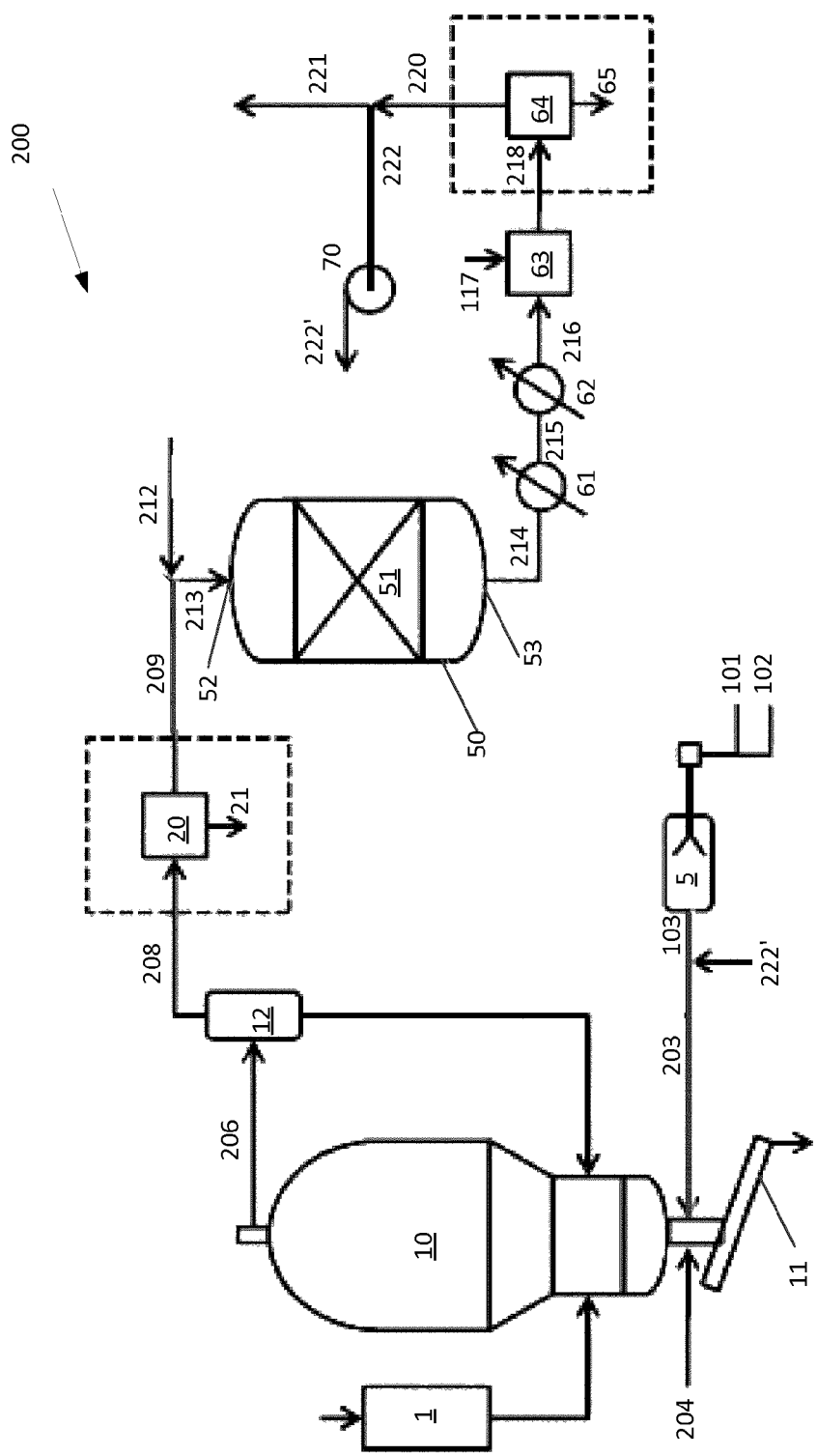
FIGS. 2 to 5 show schematic drawings of specific embodiments of the invention.

FIG. 2 shows a schematic drawing of a system 200 according to the invention for regenerating a catalyst within a tar reformer 50 comprising catalyst in one or more catalyst beds 51. The tar reformer 50 is a part of a biomass gasification system as shown in FIG. 1. It should be noted that the system 200 comprises the units for tar reforming shown in the system 100 of FIG. 1, and that only a few extra units have been added to the tar reforming system in order to make it suitable for catalyst regeneration.

Thus, the biomass feeding system 1, the biomass gasification unit 10, the cyclone 12, the filters 20, 64, the reformer 50, the heat exchangers 61, 62, and the quenching unit 63 are similar to the corresponding units described in relation to FIG. 1. These units will therefore not be described further here.

The system 200 corresponds to an embodiment, wherein the main gas stream 213 admitted to the tar reformer 50 comprises a stream 203 combined of a flue gas 103 from the burner 5 and a recycle stream 222'. The stream 203 is arranged to pass through the biomass gasification unit 10 upstream of the reformer 50, and to exit the biomass gasification unit 10 as the stream 206. The stream 206 enters the cyclone and exits it as a stream 208. Since no substantial particulate matter, dust or solids are present in the stream 206, streams 206 and 208 are substantially similar. The stream exiting the optional filter 20 is denoted 209. The stream 209 is in essence a combustion gas or flue gas, when the system is operated in catalyst regeneration mode. The main contributing stream of the gas stream 209 is typically the recycle stream 222'.

In order to adjust the oxygen content of the main gas stream 213 entering the reformer 50, an optional oxidant gas stream with controlled oxygen content 212 is added to the stream 209. By combining the stream 209 with an oxidant gas stream, it is possible to ensure that the main gas stream 213 is a regeneration gas stream. Alternatively, oxidant gas 204, upstream the biomass gasification unit 10, may be added in order to control the oxygen content of the stream 209 precisely.

The regeneration gas stream 213 reacts within the reformer 50 during the regeneration of the catalyst 51 and exits the reformer 50 as oxygen-depleted or oxygen reduced gas stream 214. Subsequent to heat exchange and water quenching within heat exchangers 61, 62 and quenching unit 63, respectively, and subsequent to the optional filter 64, the resultant regeneration stream 220 is divided into two streams 221 and 222. One part of the regeneration stream 220 is recycled as recycle stream 222' by means of a recycle blower 70, whilst the other part 221 of the regeneration stream is not recycled. Instead the other part 221 is flared or vented to the surroundings, depending on its specific content and/or the system 200. The recycle stream 222' is added just after the burner 5 which is used to control the temperature of the mixed recycle and combustion gas. The control of oxygen 102 to the burner, or more precisely the oxidant to fuel ratio, in turn provides control of the oxygen content of the regenerative gas 213.

Typically, no substantial amounts of biomass are present in the biomass gasification unit 10 during regeneration of the catalyst 51 in the tar reformer 50. However, the regeneration of the catalyst preferably takes place soon after shut-down of the gasification unit 10, where the temperature of the biomass gasification unit 10 still is elevated compared to the surroundings due to the maintained sensible heat in the gasifier materials after stopping the high temperature gasification process. In this case, the flue gas from the burner 103, 203 passing through the biomass gasification unit 10 may draw heat from the walls of the gasification unit 10, thereby lowering at least the initial load on the equipment for heating the main gas stream 213.

An advantage of the embodiment 200 shown in FIG. 2 is that substantially no extra equipment is necessary to carry out the regeneration process in an existing biomass gasification plant with a tar reforming unit 50 installed, except from the equipment for recycling gas exiting from the tar reformer 50 back to the tar reformer 50. Such equipment for recycling comprises e.g. a recycle blower 70 and gas pipes from the recycle blower to the gas stream just downstream the burner 5.

Figure 3:
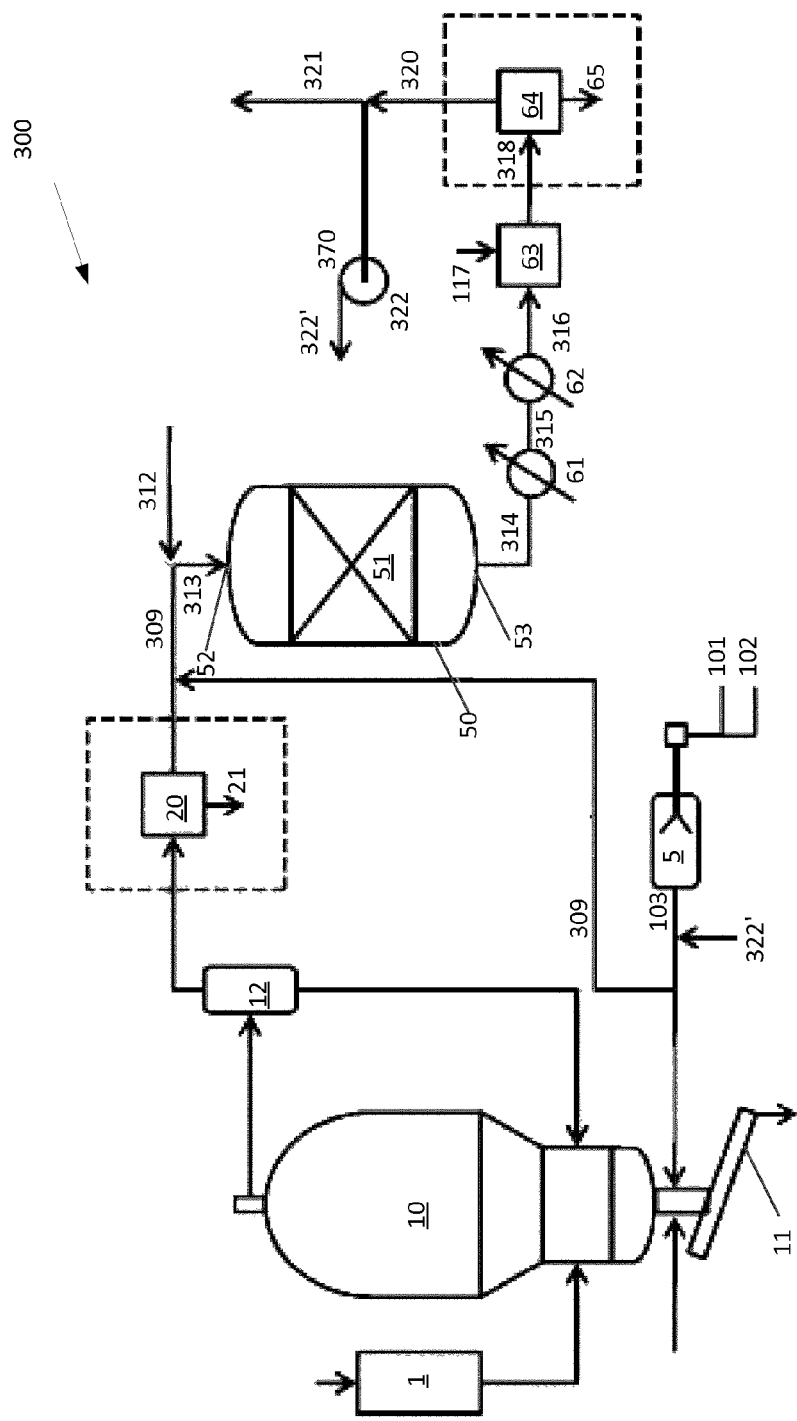

FIG. 3 shows a schematic drawing of a system 300 according to the invention for regenerating a catalyst within a tar reformer 50. It should be noted that the system 300 comprises the units for tar reforming shown in the system 100 of FIG. 1, and that only a few extra units have been added to the tar reforming system in order to make it suitable for catalyst regeneration.

Thus, the biomass feeding system 1, the biomass gasification unit 10, the cyclone 12, the filters 20, 64, the reformer 50, the heat exchangers 61, 62, and the quenching unit 63 are thus similar to the similar units described in relation to FIG. 1. These units will therefore not be described further here. However, it should be noted that during catalyst regeneration, the biomass feeding unit 1, the biomass gasification unit 10, the cyclone 12, and the filter 20 are not in operation.

The system 300 corresponds to an embodiment, wherein the main gas stream 313 admitted to the tar reformer 50 comprises a stream 309 combined of a flue gas 103 from the burner 5 and a recycle stream 322', where the stream 309 bypasses the biomass gasification unit 10, the cyclone 12, and the optional filter 20. Moreover, the stream 309 is optionally combined with an oxidant gas stream with controlled oxygen content 312 prior to being admitted to the reformer 50 through the inlet 52. By combining the stream 309 with an oxidant gas stream, it is ensured that the main gas stream 313 admitted into the tar reformer 50 is a regeneration gas stream.

The main gas stream 313 reacts within the reformer 50 during the regeneration of the catalyst 51 and exits the reformer 50 as an oxygen-deprived or oxygen-reduced gas stream 314. Subsequent to heat exchange and water quenching within heat exchangers 61, 62 and quenching unit 63, respectively, and subsequent to the optional filter 64, the resultant regeneration stream 320 is divided into two streams 321 and 322. One part 322 of the regeneration stream 320 is recycled as recycle stream 322' by means of a recycle blower 70, whilst the other part 321 of the regeneration stream is not recycled. Instead the other part 321 is flared or vented to the surroundings, depending on its specific content and/or the system 300. The recycle stream 322' is added just after the burner 5 which is used to control the temperature of the mixed recycle and combustion gas. The control of oxygen 102 to the burner, or more precisely the oxidant to fuel ratio, in turn provides control of the oxygen content of the regenerative gas 313.

An advantage of the system 300 shown in FIG. 3 is that substantially no extra equipment is necessary to carry out the regeneration process in an existing biomass gasification plant with a tar reforming unit installed, except from the gas pipes from the burner 5 to the inlet 52 of the tar reformer and the equipment for recycling gas exiting from the tar reformer 50 back to the tar reformer 50. Such equipment for recycling comprises e.g. a recycle blower 70 and gas pipes from the recycle blower to the gas stream just downstream the burner 5. Moreover, higher regeneration temperatures are typically possible in the system 300 compared to the system 200, since the regeneration temperatures will not be limited design temperatures for the gasification unit 10 and/or the filter 20; these units 10, 20 typically have lower design temperatures than the reformer 50.

Figure 4:
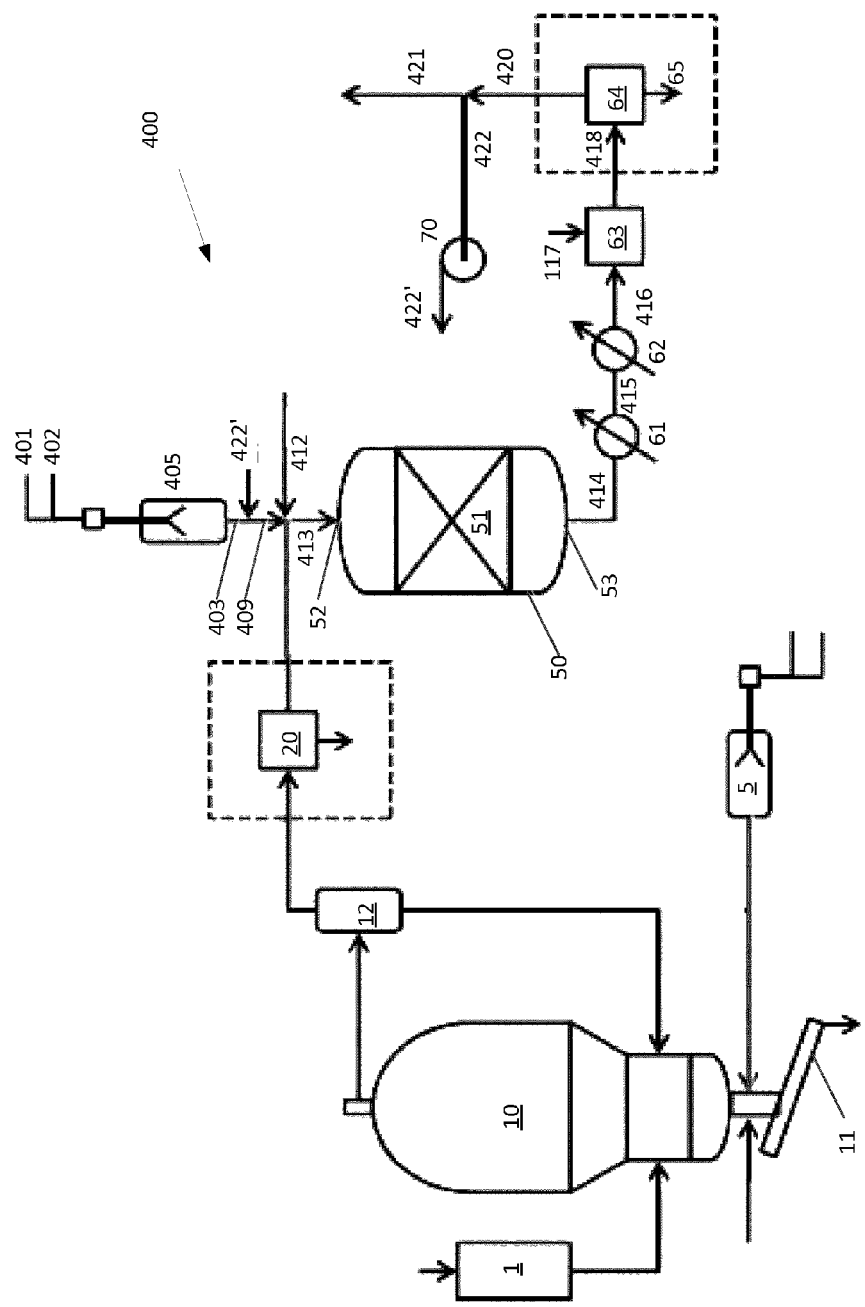

FIG. 4 shows a schematic drawing of a system 400 according to the invention for regenerating a catalyst within a tar reformer 50. It should be noted that the system 400 comprises the units for tar reforming shown in the system 100 of FIG. 1, and that only a few extra units have been added to the tar reforming system in order to make it suitable for catalyst regeneration.

Thus, the biomass feeding system 1, the biomass gasification unit 10, the cyclone 12, the filters 20, 64, the reformer 50, the heat exchangers 61, 62, and the quenching unit 63 are thus similar to the similar units described in relation to FIG. 1. These units will therefore not be described further here. However, it should be noted that during catalyst regeneration, the biomass feeding unit 1, the biomass gasification unit 10, the cyclone 12, and the filter 20 and the burner 5 are not in operation.

The system 400 shows an embodiment, wherein the main gas stream 413 admitted to the tar reformer 50 comprises a stream 409 combined of a flue gas 403 from an additional burner 405 and a recycle stream 422', where the stream 409 is optionally combined with an oxidant gas stream with controlled oxygen content 412 prior to being admitted to the reformer 50 through the inlet 52. By combining the stream 409 with an oxidant gas stream, it is ensured that the main gas stream 413 admitted into the tar reformer 50 is a regeneration gas stream.

Fuel 401 and an oxidant gas 402 is input to the burner 405.

The regeneration gas stream 413 reacts within the reformer 50 during the regeneration of the catalyst 51 and exits the reformer 50 as oxygen-deprived or oxygen-reduced gas stream 414. Subsequent to heat exchange and water quenching within heat exchangers 61, 62 and quenching unit 63, respectively, and subsequent to the optional filter 64, the resultant gas stream 420 is divided into two streams 421 and 422. The stream 422 is recycled as recycle stream 422' by means of a recycle blower 70, whilst the other part 421 of the regeneration stream is not recycled. Instead the other part 421 is flared or vented to the surroundings, depending on its specific content and/or the system 400. The recycle stream 422' is added just after the additional burner 405 which is used to control the temperature of the mixed recycle and combustion gas. The control of oxygen 402 to the burner, or more precisely the oxidant to fuel ratio, in turn provides control of the oxygen content of the regenerative gas 413.

An advantage of the system 400 shown in FIG. 4 is that higher regeneration temperatures are possible, since the regeneration temperatures are not limited by equipment, through which the main gas flows, but only the reformer design temperature. Typically, both the biomass gasification unit 10 and the filter 20 have lower design temperatures than the reformer 50.

Figure 5:
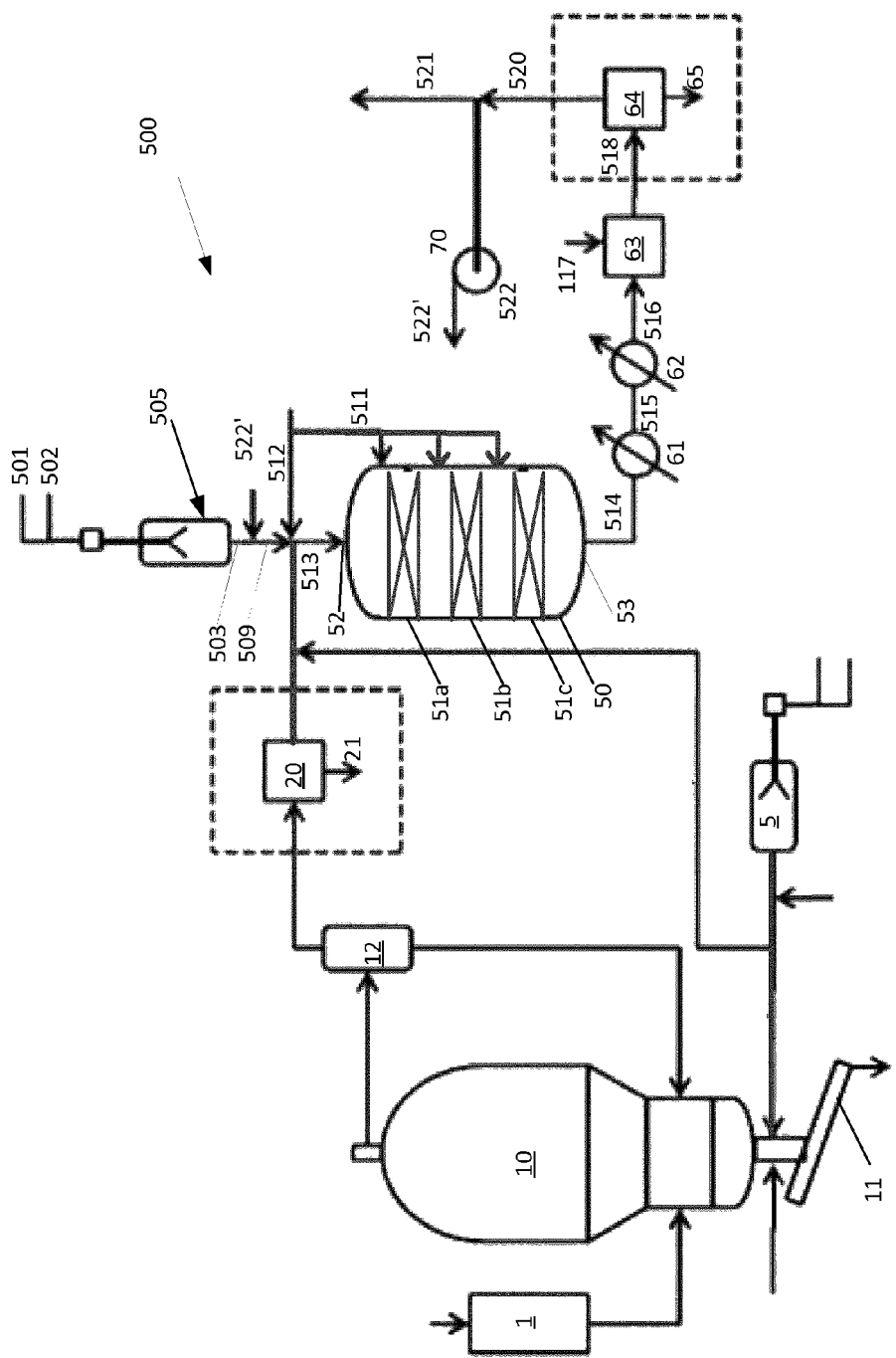

FIG. 5 shows a schematic drawing of a system 500 according to the invention for regenerating a catalyst within a tar reformer 50. It should be noted that the system 500 comprises the units for tar reforming shown in the system 100 of FIG. 1, and that only a few extra units have been added to the tar reforming system in order to make it suitable for catalyst regeneration.

Thus, the biomass feeding system 1, the biomass gasification unit 10, the cyclone 12, the filters 20, 64, the reformer 50, the heat exchangers 61, 62, and the quenching unit 63 are thus similar to the similar units described in relation to FIG. 1. These units will therefore not be described further here. However, it should be noted that during catalyst regeneration, the biomass feeding unit 1, the biomass gasification unit 10, the cyclone 12, the burner 5 and the filter 20 are not in operation Moreover, the fuel 501 and an oxidant gas 502 input to an additional burner 505, as well as the main gas stream 513 admitted to the tar reformer 50 comprising a stream 509 combined of a flue gas 503 from the additional burner 505 and a recycle stream 522' is similar to that shown in FIG. 4. In the system 500, the stream 509 is optionally combined with an oxidant gas stream with controlled oxygen content 512 prior to being admitted to the reformer 50 through the inlet 52. When the stream 509 is combined with an oxidant gas stream, the main gas stream 513 admitted into the tar reformer 50 will be a regeneration gas stream.

The regeneration gas stream 513 reacts within the reformer 50 during the regeneration of the catalyst 51 and exits the reformer 50 as oxygen-depleted or oxygen-reduced regeneration gas 514. Subsequent to heat exchange and water quenching within heat exchangers 61, 62 and quenching unit 63, respectively, and subsequent to the optional filter 64, the resultant gas stream 520 is divided into two streams 521 and 522. The stream 522 is recycled as recycle stream 522' by means of a recycle blower 70, whilst the other part 521 of the regeneration stream is not recycled. The recycle stream 522' is added just after the additional burner 505 arranged to control the temperature of the mixed recycle and combustion gas. The control of oxygen 502 to the burner, or more precisely the oxidant to fuel ratio, in turn provides control of the oxygen content of the regenerative gas 513.

It is seen from FIG. 5 that the system 500 is substantially equivalent to the system 400. However, a difference between the systems 400 and 500 shown in FIGS. 4 and 5, respectively, is that the reformer 50 has three catalyst beds 51a, 51b and 51c, in the system 500 of FIG. 5, whilst the reformer 50 in the FIGS. 2-4 has been shown to have only one catalyst bed. It should be noted than any appropriate number of catalyst beds is conceivable, and that the three catalyst beds is only an example. Thus, the reformer having more than one catalyst bed could comprise two catalyst beds or four or more catalyst beds.

Thus, as shown in FIG. 5, an optional oxidant gas stream with controlled oxygen content 511 is added directly into the reformer 50 without prior mixing with the stream 509. The optional oxidant gas stream with controlled oxygen content 511 may be added in a case where the oxidant gas stream 512 is added to the stream 509; alternatively the optional oxidant gas stream with controlled oxygen content 511 in a situation where no oxidant gas stream 512 is added to the stream 509.

In one example, the oxidant gas stream 511 is inlet into the tar reformer downstream at least one catalyst bed, e.g. between the two catalyst beds 51a and 51b or between the two catalyst beds 51b and 51c. Thus, the oxidant gas stream 511 may be inlet into the tar reformer upstream at least one catalyst bed, that is between the inlet 52 to the reformer 50 and the catalyst bed 51a, between the two catalyst beds 51a and 51b, or between the two catalyst beds 51b and 51c. Typically, a tar reformer 50 has inlets upstream the catalysts beds, so that no substantial changes are necessary in order to admit such oxidant gas streams 511 downstream or upstream specific catalyst beds 51a, 51b, 51c.

The oxidant gas stream 511 may firstly be admitted as a stream to the, under tar reforming conditions, most upstream catalyst bed, viz. catalyst bed 51a in FIG. 5, such that the catalyst beds 51a-51c are regenerated one by one, from the most upstream to the most downstream catalyst bed. However, by feeding the oxidant gas 511 as a stream into the tar reformer 50 in reverse order, from the most downstream catalyst bed 51c to the most upstream catalyst bed 51a, a process is provided wherein the temperature development in the tar reformer 50 is particularly controllable. It should be noted, that the examples given above in relation to the inletting of the oxidant gas stream 511 at certain positions in relation to the catalyst beds is related to the example shown, with three catalyst beds. This example is extendable to any appropriate number of catalyst beds so that in the case where the reformer comprises more than three catalyst beds, the oxidant gas 511 may be fed into the reformer at more positions than indicated in relation to the example of FIG. 5.

When an oxidant gas stream 511, 512 with controlled oxygen content is added to the stream 509 and/or admitted into one or more further inlets into the tar reformer, it is possible to carry out a more precise control of the oxygen content within the reformer 50, and thus the temperature during regeneration of the catalyst. The oxidant gas stream 511, 512 comprises for example air, enriched air, oxygen, steam and/or carbon dioxide. In the case where no oxidant gas stream with controlled oxygen content 512 is added to the gas stream 509, the main gas stream 513 is typically in itself still a regenerative gas stream, since is it an oxidant gas stream.

However, at sufficiently low oxygen-to-fuel ratios (between the streams 501, 502), the main gas stream 513 might not in itself be regenerative. In this case, the main gas stream 513 only becomes a regeneration gas stream upon mixing with the oxidant gas stream 511 within the tar reformer 50, either upstream the most upstream catalyst bed 51a or between two catalyst beds 51a, 51b, 51c.

The reformer 50 in the system 500 shown in FIG. 5 has been shown to have a number of catalyst beds in the embodiment corresponding to that of the system 400 of FIG. 4. It should be noted that this feature of a plurality of catalyst beds within the reformer and the possibility of providing oxidant gas between the catalyst beds, viz. upstream and/or downstream specific catalyst beds, may also be combined with the systems 200 and 300 shown in FIGS. 2 and 3, respectively.

As a general example only, the numerical values of flow, temperatures a.o. may be as follows:
The flow F through the reformer 50 during catalyst regeneration: F=4000±500 Nm$^3$/h;
The pressure P within the reformer 50 during catalyst regeneration: P is between 0 and 3 barg; for example P=70-80 mbarg;
The temperature $T_{inlet}$ of the main gas stream 213, 313, 413, 513 at the reformer inlet 52: $T_{inlet}$ is between 500° C. and 1000° C.; for example $T_{inlet}$=750° C.±50° C.;
The temperature $T_{reformer}$ of the regeneration gas stream within the reformer: $T_{reformer}$ is between 500° C. and 1000° C.; for example $T_{reformer}$=800±50° C.;
The temperature $T_{recycle}$ of the recycled gas stream 222', 322', 422', 522': $T_{recycle}$ is between 100° C. and 500° C.; for example $T_{recycle}$=300° C.;
Fuel flow $F_{oil}$ (LFO)=35 kg/h;
Flow of air/oxidant gas $F_{air}$=900 kg/h;
composition of air/oxidant gas:
$O_2$: between 0.1 and 5%, for example about 1-2%;
$CO_2$: between 10 and 20%, for example about 14%;
$H_2O$: between 10 and 20%, for example about 10%;
$N_2$: the rest, about 75%.

It should be noted that the numerical values given in the example above is just one example. The temperature ranges would typically be valid for different tar reformer regenerations systems; however, the flow values are specific for the example given.

SPECIFIC EXAMPLE

Below is given a table indicating conditions during a specific example of a catalyst regeneration process for reforming catalyst within a catalyst bed in a tar reformer according to the invention.

TABLE 1

|  | Period 1 | Period 2 | Period 3 |
| --- | --- | --- | --- |
| Time (hrs) | 0-5.5 | 5.5-8.5 | 8.5- |
| O2 (vol %) | 0-4.2 | 4.2-17.2 | 17.2-20.0 |
| CO2 (vol %) | 13.9-10.4 | 10.4-2.8 | 2.8-0.0 |
| Burner air-to-LFO ratio (kg/kg) | 26-30 | 51 | pure air |
| Max temp in reformer (° C.) | 960 | 950 | 930 |

Table 1 indicates three time periods, Period 1, Period 2 and Period 3. For each time period, the time span of the period is given in hours and the $O_2$ and $CO_2$ are indicated in vol % of dry exit gas from the tar reformer. LFO again indicates Fuel flow $F_{oil}$ and the "Max temp in reformer" indicates the maximum temperature measured within the tar reformer within the given period.

Within Period 1, for the first hours of the regeneration, the oxygen ($O_2$) level in the dry exit gas from the reformer changes from 0 vol % (corresponding to a relatively low burner air-to-LFO ratio and a relatively high conversion of carbon to carbon dioxide ($CO_2$)) to 4.2 vol %. Meanwhile, the $CO_2$ content in the dry exit gas is reduced from 13.9 vol % to 10.4 vol %, and the burner-air-to-LFO ratio is increased from 26 to 30. The maximum temperature within the tar reformer in period 1 is 960° C. Period 1 is seen as the most critical period within the catalyst regeneration process in relation to temperature control.

In Period 2, from between to hours from the start of the regeneration of the reforming catalyst, the burner air-to-LFO ratio is ramped up to 51, and the oxygen level within the dry exit gas is increased to the range between 4.2 to 17.2 vol %, whilst the carbon dioxide level in the dry exit gas is reduced from 10.4 to 2.8 vol %. The maximum temperature with the tar reformer in Period 2 is 950° C.

In period 3, from hours onwards, pure air, corresponding to no Fuel flow $F_{oil}$, is used for the last regeneration of the catalyst. The oxygen level in the dry exit gas from the reformer increases within Period 3, from 17.2 to 20.0 vol %, whilst the last carbon is burned off, corresponding to a reduction of the carbon dioxide within the dry exit air from the reformer from 2.8 to 0.0 vol % within Period 3. Period 3 may go on as long as required, typically until the reformer is cooled off sufficiently.

The regeneration is carried out—in all three periods—under recirculation conditions with burner gas to recirculation gas ratios similar to the burner gas to recirculation gas ratios implicitly indicated in the general example above.

Again, the numerical values given in the example and table above are just exemplary and should not be seen as limiting the invention.

For all the embodiments shown in FIGS. 2 to 4, as well as the example given above, it is advantageous to blanket the system in nitrogen prior to the catalyst regeneration. This is due to the presence of synthesis gas within the system subsequent to biomass gasification and the risk for providing oxidant gas streams into a system with syngas.

It is advantageous that the temperature of the main gas stream $T_{inlet}$ is above about 650° C., in that it assists in avoiding any sulfur present from combining with Ni to nickel sulfate. Moreover, some of the carbon is inert and requires relatively high temperatures, such as above about 650° C., in order to react with the regeneration gas stream during regeneration.

Figure 6:
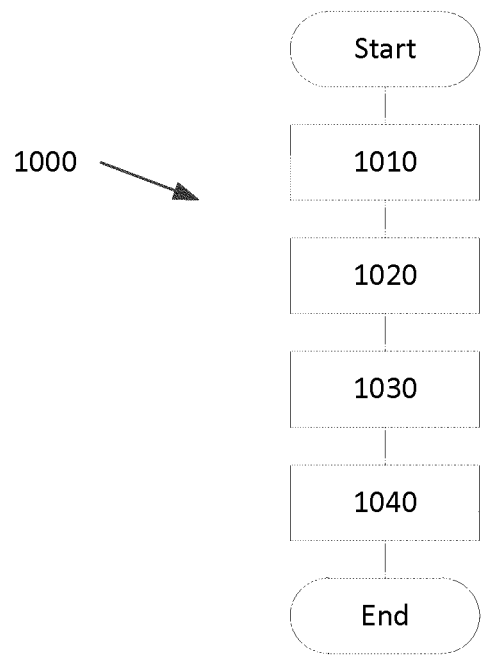
FIG. 6 shows a process according to the invention.

FIG. 6 shows a process 1000 according to the invention for a tar reforming catalyst within a catalyst bed in a tar reformer.

The process 1000 comprises the following steps:

Admitting 1010 a main gas stream with controlled oxygen content to an inlet into a tar reformer.

Passing 1020 the main gas stream through the catalyst bed to form an oxygen depleted gas stream.

Exiting 1030 the oxygen depleted gas stream from the tar reformer.

Recycling 1040 at least a part of the oxygen depleted gas stream exiting from the tar reformer back into the main gas stream upstream the tar reformer.

The temperature of said main gas stream at the inlet is controlled to be within the range from about 500° C. to about 1000° C.

The process 1000 ends in step 1050.

While numerous embodiments in accordance with this invention have been described, it will be understood that these embodiments are illustrative only and not limiting of the broad scope or the broad principles of this invention. The term "comprising" includes, but is not limited to, whatever follows the word "comprising". Thus, use of the term indicates that the listed elements are present or required but that other elements are optional and may or may not be present.

The invention claimed is:

1. A catalyst regeneration process for a tar reforming catalyst within a catalyst bed in a tar reformer, said process comprising the steps of:
    admitting a main gas stream with controlled oxygen content to an inlet into said tar reformer;
    passing said main gas stream through said catalyst bed to form an oxygen depleted gas stream;
    exiting said oxygen depleted gas stream from said tar reformer; and
    recycling at least a part of the oxygen depleted gas stream exiting from said tar reformer back into said main gas stream upstream said tar reformer;
    wherein the temperature of said main gas stream at said inlet is controlled to be within the range from about 500° C. to about 1000° C.

2. A catalyst regeneration process according to claim 1, wherein the temperature of said main gas stream at said inlet is controlled to be in the range between about 500° C. and about 950° C., preferably in the range between about 650° C. and about 950° C., more preferably in the range between about 700° C. and about 900° C.

3. A catalyst regeneration process according to claim 1, wherein an additional oxidant gas stream with controlled oxygen content is added to the main gas stream and/or is admitted into one or more further inlets into the tar reformer.

4. A catalyst regeneration process according to claim 3, wherein the tar reformer comprises a plurality of catalyst beds, wherein said additional oxidant gas stream is inlet into the tar reformer downstream at least one catalyst bed.

5. A catalyst regeneration process according to claim 3, wherein the tar reformer comprises a plurality of catalyst beds, wherein said additional oxidant gas stream is inlet into the tar reformer upstream at least one catalyst bed.

6. A catalyst regeneration process according to claim 1, wherein the main gas stream to the tar reformer comprises a flue gas resulting from combusting a fuel in a burner, and where said flue gas passes through a biomass gasification unit upstream of the reformer.

7. A catalyst regeneration process according to claim 1, wherein the main gas stream to the tar reformer comprises a flue gas resulting from combusting a fuel in a burner, and where said flue gas has by-passed a biomass gasification unit.

8. A catalyst regeneration process according to claim 1, wherein the main gas stream to the tar reformer comprises a flue gas resulting from combusting a fuel in an additional burner.

9. A catalyst regeneration process according to claim 6, wherein said main gas stream admitted to the tar reformer comprises a flue gas resulting from combusting a fuel containing sulfur in a burner.

10. A catalyst regeneration process according to claim 1, wherein the tar reformer is a clean tar reformer, the catalyst is a pellet or monolith catalyst and a regeneration gas stream, comprising the main gas stream and the optional additional gas stream, has an oxygen content of maximum 3 vol %.

11. A catalyst regeneration process according to claim 1, wherein the tar reformer is a dusty tar reformer, the catalyst is a monolith catalyst and a regeneration gas stream, comprising the main gas stream and the optional additional gas stream, has an oxygen content of maximum 3 vol %.

12. A catalyst regeneration process according to claim 1, wherein said main gas stream has a sulfur content of up to 200 ppmv.

13. A catalyst regeneration process according to claim 1, wherein the tar reformer is a dusty tar reformer, the catalyst is a monolith catalyst having only a small amount of carbonaceous material deposition, wherein a regeneration gas stream comprising the main gas stream and the optional additional gas stream has an oxygen content in the range from about 9 vol % to about 17 vol %, preferably in the range from about 12 vol % to about 14 vol %.

14. A catalyst regeneration process according to claim 1, wherein the tar reformer is a dusty tar reformer, the catalyst is a monolith catalyst having only a small amount of carbonaceous material deposition, wherein biomass is combusted in the gasifier during start-up and wherein the flue gas from the combusted biomass is directed through the tar reformer in order to regenerate the catalyst at least partly during start-up of the biomass gasification system.

* * * * *